(12) United States Patent
Ardkapan et al.

(10) Patent No.: US 12,486,995 B2
(45) Date of Patent: Dec. 2, 2025

(54) BUILDING VENTILATION SYSTEM AND METHOD FOR VENTILATING A BUILDING

(71) Applicant: Respired Limited, London (GB)

(72) Inventors: Siamak Rahimi Ardkapan, Copenhagen (DK); Christian Hendriksen, London (GB); Frederik Hendriksen, London (GB)

(73) Assignee: Respired Limited, London (GB)

( * ) Notice: Subject to any disclaimer, the term of this patent is extended or adjusted under 35 U.S.C. 154(b) by 0 days.

(21) Appl. No.: 18/905,945

(22) Filed: Oct. 3, 2024

(65) Prior Publication Data

US 2025/0305697 A1 Oct. 2, 2025

(30) Foreign Application Priority Data

Mar. 29, 2024 (DK) .......................... PA 2024 30144

(51) Int. Cl.
| | |
|---|---|
| *F24F 11/46* | (2018.01) |
| *F24F 8/00* | (2021.01) |
| *F24F 11/58* | (2018.01) |
| *F24F 11/77* | (2018.01) |
| *F24F 110/10* | (2018.01) |
| *F24F 110/12* | (2018.01) |
| *F24F 110/66* | (2018.01) |
| *F24F 110/70* | (2018.01) |

(52) U.S. Cl.
CPC ................ *F24F 11/46* (2018.01); *F24F 8/00* (2021.01); *F24F 11/58* (2018.01); *F24F 11/77* (2018.01); *F24F 2110/10* (2018.01); *F24F 2110/12* (2018.01); *F24F 2110/66* (2018.01); *F24F 2110/70* (2018.01)

(58) Field of Classification Search
CPC ....... F24F 8/00; F24F 2110/66; F24F 2110/70
See application file for complete search history.

(56) References Cited

U.S. PATENT DOCUMENTS

| 11,747,037 B2 | 9/2023 | Douglas et al. |
|---|---|---|
| 2006/0234621 A1 | 10/2006 | Desrochers et al. |

(Continued)

FOREIGN PATENT DOCUMENTS

| EP | 4119856 A1 | 1/2023 |
|---|---|---|
| WO | 2016180703 A1 | 11/2016 |
| WO | 2020055817 A1 | 3/2020 |

*Primary Examiner* — Nathan L Laughlin
(74) *Attorney, Agent, or Firm* — Elevated IP, LLC

(57) ABSTRACT

Building ventilation systems comprising one or more air handling units arranged and configured to receive air from outside a building comprising one or more building areas and deliver outdoor air into a building are disclosed. The building ventilation system comprises a plurality of air quality sensors arranged to measure the quality of the air inside the building. The building ventilation system comprises a control system connected to the air handling units and configured to receive data from the air quality sensors. The control system is configured to control the activity of the air handling units in dependency of the data from the air quality sensors. The building ventilation system comprises a plurality of air cleaning units arranged to eliminate gaseous and particulate pollutants from the air inside the building. The control system is configured to control the air cleaning units in dependency of the data from the air quality sensors.

21 Claims, 9 Drawing Sheets

(56) References Cited

U.S. PATENT DOCUMENTS

| | | | |
|---|---|---|---|
| 2015/0032264 A1* | 1/2015 | Emmons | F24F 11/0001 |
| | | | 700/276 |
| 2017/0261979 A1* | 9/2017 | KM | B25J 9/1664 |
| 2017/0350611 A1 | 12/2017 | Su et al. | |
| 2020/0141604 A1* | 5/2020 | Chen | F24F 11/47 |
| 2021/0003310 A1 | 1/2021 | Shnaiderman et al. | |
| 2021/0063036 A1 | 3/2021 | Oh et al. | |
| 2021/0207825 A1* | 7/2021 | Kang | B01D 53/30 |
| 2022/0304529 A1* | 9/2022 | Jones | A47L 9/28 |
| 2022/0312698 A1* | 10/2022 | Burkey | G06Q 10/063 |
| 2022/0341609 A1 | 10/2022 | Mcnamara et al. | |
| 2023/0042065 A1 | 2/2023 | Douglas et al. | |
| 2023/0175725 A1* | 6/2023 | Prigge | F24F 11/74 |
| | | | 454/256 |

* cited by examiner

BUILDING VENTILATION SYSTEM AND METHOD FOR VENTILATING A BUILDING

CROSS-REFERENCE TO RELATED APPLICATIONS

This application claims the benefit of and priority to Danish Application No. PA 2024 30144, filed Mar. 29, 2024, which is hereby incorporated by reference in its entirety.

FIELD OF INVENTION

The present invention relates to a building ventilation system comprising one or more air handling units arranged and configured to receive air from outside a building that comprises one or more building areas, wherein the one or more air handling units are arranged and configured to deliver outdoor air into the building. The invention also relates to a method for ventilating a building.

BACKGROUND

Building ventilation is important in order to maintain a comfortable indoor environment in a building. The indoor environment of a building is crucial for several reasons, ranging from health and well-being to productivity and comfort.

First of all, people spend a significant amount of time indoors, whether it's in homes, offices, schools, or other buildings. The indoor environment directly impacts occupants' health and safety. Poor indoor air quality, for instance, can lead to respiratory problems, allergies, and other health issues. Proper ventilation, temperature control, and moisture management are essential for maintaining a healthy indoor environment and preventing issues like mold growth, which can have serious health implications.

Comfortable indoor conditions contribute to occupants' overall well-being and productivity. Factors such as temperature, humidity, lighting, and acoustics play a significant role in creating a comfortable indoor environment. For example, maintaining optimal temperature levels and controlling humidity ensures that occupants feel comfortable and can focus on their tasks without distraction.

Studies have shown that a well-designed indoor environment can enhance productivity and cognitive performance. Good lighting, adequate ventilation, comfortable temperatures, and low noise levels can all positively impact concentration, creativity, and task performance. Conversely, a poor indoor environment characterized by factors like poor air quality or uncomfortable temperatures can hinder productivity and lead to absenteeism.

The indoor environment also affects a building's energy efficiency. Proper insulation, efficient heating, ventilation, and air conditioning (HVAC) systems, and smart building management practices contribute to maintaining comfortable indoor conditions while minimizing energy consumption and associated costs. Energy-efficient buildings not only reduce operating expenses but also have a lower environmental impact by reducing greenhouse gas emissions.

Indoor environmental quality is a key aspect of sustainable building design and operation. Sustainable buildings prioritize factors such as energy efficiency, resource conservation, and occupant health and well-being. By promoting a healthy indoor environment and reducing resource consumption, sustainable buildings contribute to environmental stewardship and long-term viability.

Many jurisdictions have regulations and standards in place to ensure that buildings provide a safe and healthy indoor environment for occupants. Compliance with these regulations is essential for building owners and operators to avoid legal issues and liabilities.

When typical building ventilation systems are used, the building will typically have building areas with dead zones. Moreover, the prior art building ventilation systems spend a lot of energy to heat or cool indoor air that is blown into the building areas of the building.

It is known to use the so-called Demand-Controlled Ventilation (DCV) system in buildings. In a traditional DCV system, the system regulates the supplied air's flow rate and temperature/humidity. In DCV systems, however, there is no detailed information about the air quality parameters, such as Volatile Organic Compounds (VOC) and particle concentration on a very granular basis. Accordingly, the prior art DCV systems are not designed to take into consideration air quality parameters, such as VOC and particle concentrations in the indoor air.

US 2017350611 A1 discloses an arrangement for air management of a room that comprises ventilating means for enabling exchange of air between the inside environment of the room and the outside environment of the room. A single stand-alone air purifier, which is arranged separately from the ventilating means, is adapted to remove pollutants from the air in the inside environment of the room. A control system, which is in communication with both the ventilating means and the air purifier, is adapted to control operation of the ventilating means and the air purifier in dependence of air quality data relating to the inside environment of the room and the outside environment of the room. The control system is configured to control the ventilating means and the air purifier differently depending on whether the air quality data relating to the outside environment of the room is above or below a predetermined reference. Operation of the arrangement is aimed at optimizing indoor air quality and minimizing energy consumption. This solution is, however, difficult to operate in a cost efficient manner.

Thus, there is a need for a building ventilation system and a method for ventilating a building which reduces or even eliminates the above mentioned disadvantages of the prior art.

BRIEF DESCRIPTION

It is an object of the present disclosure to provide a building ventilation system and a method for ventilating a building that reduces generation of dead zones and is more energy efficient than the prior art solutions. It is also an object of the present systems and methods to improve the indoor air quality.

A building ventilation system according to an embodiment is a building ventilation system for a building comprising one or more building areas, the building ventilation system comprising:
  one or more air handling units arranged and configured to receive outdoor air from outside the building and deliver the outdoor air into the building;
  a plurality of air quality sensors arranged to measure the quality of the air inside the building;
  a control system connected to the air handling units and configured to receive data from the air quality sensors, wherein the control system is configured to control the activity of the air handling units in dependency of the data from the air quality sensors, wherein the building ventilation system comprises a plurality of air cleaning units arranged to eliminate gaseous and particulate pollutants from the air inside the building, wherein the control system is configured to control the air cleaning units in dependency of the data from the air quality sensors, wherein the control system is configured to calculate the minimum outdoor air flow rate for each building area required to meet a predefined range of allowable $CO_2$ content (concentration) for each building area, wherein the control system is configured to take into consideration the cleaning effect provided by each of the air cleaning units for each building area, wherein the control system is configured to carry out a cost specific optimization of the activity of air handling units and air cleaning units. A cost specific optimization can be carried out if the control system has access to energy cost data and is able to anticipate the energy consumption of the air handling units and the air cleaning units.

Hereby, it is possible to provide a building ventilation system that reduces generation of dead zones and is more energy efficient than the prior art solutions. It is also possible to provide a building ventilation system that can improve the indoor air quality.

Energy can be saved because the air cleaning units can clean air without changing the temperature of the air. The air handling units will typically introduce outside air that is colder or hotter than the preferred inside temperature. Accordingly, the building ventilation system is capable of reducing the energy expenditure.

The invention makes it possible to control each building area independently. Since the air cleaning units are controlled on the basis of local air quality parameters (data from local air quality sensors), it is possible to eliminate gaseous and particulate pollutants from the indoor air locally (only in the building areas in which air cleaning is needed).

The air cleaning units will typically be strategically positioned within buildings based on room size, occupant count, outdoor air intake, and the placement of outdoor air inlets and exhausts.

The air cleaning units are placed indoors and are designed to effectively eliminate gaseous and particulate pollutants from the indoor air.

In an embodiment, the air handling units comprise a heating unit arranged and configured to heat outdoor air before or after the outside air enters a building area of the building ventilation system.

In an embodiment, the air handling units comprise a cooling system arranged and configured to cool outdoor air before or after the outside air enters a building area of the building ventilation system.

In an embodiment, the air handling units comprise a HVAC system.

In an embodiment, the air handling units comprise a ventilator.

In an embodiment, the air handling units comprise a heat pump.

The building will typically comprise a plurality of building areas separated by walls.

Each air cleaning unit is a device configured to suck in air from indoors, remove gaseous and particle pollutants from indoors and return air to indoors.

In an embodiment, the air cleaning units are portable.

In an embodiment, the air cleaning units are integrated in the building (e.g. wall mounted).

In an embodiment, the air cleaning units are ceiling mounted.

In an embodiment, the air cleaning units are portable and equipped with wheels for easing transportation of the cleaning units.

In an embodiment, the control system is a cloud-based control system linked to the internet via a telecommunication modem.

In an embodiment, at least one of the air quality sensors is configured to detect the carbon dioxide ($CO_2$) concentration inside the building.

In an embodiment, at least one of the air quality sensors is configured to detect the concentration of formaldehyde inside the building.

It is an advantage that the control system is configured to calculate the minimum outdoor air flow rate for each building area required to meet a predefined range of allowable $CO_2$ content (concentration) for each building area, wherein the control system is configured to take into consideration the cleaning effect provided by each of the air cleaning units for each building area, wherein the control system is configured to carry out a cost specific optimization of the activity of air handling units and air cleaning units. A cost specific optimization can be carried out if the control system has access to energy cost data and is able to anticipate the energy consumption of the air handling units and the air cleaning units.

In an embodiment, the control system is configured to calculate the minimum outdoor air flow rate for each building area required to meet a predefined range of allowable temperature for each building area, wherein the control system is configured to take into consideration the cleaning effect provided by each of the air cleaning units for each building area, wherein the control system is configured to carry out a cost specific optimization of the activity of air handling units and air cleaning units.

In an embodiment, the control system is configured to calculate the minimum outdoor air flow rate for each building area required to meet a predefined range of allowable relative humidity for each building area, wherein the control system is configured to take into consideration the cleaning effect provided by each of the air cleaning units for each building area, wherein the control system is configured to carry out a cost specific optimization of the activity of air handling units and air cleaning units.

In an embodiment, the control system is configured to calculate the minimum outdoor air flow rate for each building area required to meet a predefined range of allowable volatile organic compounds (VOCs) for each building area, wherein the control system is configured to take into consideration the cleaning effect provided by each of the air cleaning units for each building area, wherein the control system is configured to carry out a cost specific optimization of the activity of air handling units and air cleaning units.

In an embodiment, the control system is configured to calculate the minimum outdoor air flow rate for each building area required to meet a predefined range of allowable particle concentration for each building area, wherein the control system is configured to take into consideration the cleaning effect provided by each of the air cleaning units for each building area, wherein the control system is configured to carry out a cost specific optimization of the activity of air handling units and air cleaning units. In an embodiment, the allowable particle concentration is less than 5 microgram/$m^3$. In an embodiment, the allowable particle concentration is less than 10 microgram/$m^3$.

In an embodiment, the control system has access to information about the size of all building areas. In an embodiment, the information about the size includes floor area and/or room volume of all building areas.

In an embodiment, the building ventilation system is configured to monitor the temperature indoor ($T_{In}$) and outside ($T_{Out}$), wherein the control system is configured to use the temperature indoor ($T_{In}$) and outside ($T_{Out}$) to calculate the minimum outdoor air flow rate for each building area required to meet a predefined range of $CO_2$ concentration for each building area.

In an embodiment, the building ventilation system is configured to monitor the temperature indoor ($T_{In}$) and outside ($T_{Out}$), wherein the control system is configured to use the temperature indoor ($T_{In}$) and outside ($T_{Out}$) to calculate the minimum outdoor air flow rate for each building area required to meet a predefined range of temperature for each building area.

In an embodiment, the building ventilation system is configured to monitor the temperature indoor ($T_{In}$) and outside ($T_{Out}$), wherein the control system is configured to use the temperature indoor ($T_{In}$) and outside ($T_{Out}$) to calculate the minimum outdoor air flow rate for each building area required to meet a predefined range of relative humidity for each building area.

In an embodiment, the building ventilation system is configured to monitor the temperature indoor ($T_{In}$) and outside ($T_{Out}$), wherein the control system is configured to use the temperature indoor ($T_{In}$) and outside ($T_{Out}$) to calculate the minimum outdoor air flow rate for each building area required to meet a predefined range of volatile organic compounds (VOCs) for each building area.

In an embodiment, the building ventilation system is configured to monitor the temperature indoor ($T_{In}$) and outside ($T_{Out}$), wherein the control system is configured to use the temperature indoor ($T_{In}$) and outside ($T_{Out}$) to calculate the minimum outdoor air flow rate for each building area required to meet a predefined range of particle concentration for each building area.

In an embodiment, the building ventilation system comprises temperature sensors arranged and configured to detect temperature indoor ($T_{In}$) and the outside temperature ($T_{Out}$).

In an embodiment, each air cleaning unit comprises one or more air quality sensors arranged inside the air cleaning unit.

In an embodiment, at least one of the one or more air quality sensors is configured to detect the $CO_2$ concentration inside the air cleaning unit.

In an embodiment, at least one of the one or more air quality sensors is configured to detect the temperature inside the air cleaning unit.

In an embodiment, at least one of the one or more air quality sensors is configured to detect the relative humidity inside the air cleaning unit.

In an embodiment, at least one of the one or more air quality sensors is configured to detect the volatile organic compounds (VOCs) inside the air cleaning unit.

In an embodiment, at least one of the one or more air quality sensors is configured to detect the particle concentration inside the air cleaning unit. The airborne particulate matter (PM) is considered to be a mixture of many chemical species constituting a mixture of solids and aerosols composed of small droplets of liquid, dry solid fragments, and solid cores with liquid coatings. The size, shape and chemical composition of the particles typically vary widely and may contain inorganic ions, metallic compounds, elemental carbon, and/or organic compounds. Particles are typically identified and defined by their diameter for air quality regulatory purposes:

PM10: particles with a diameter of 10 micrometers or less,
PM5: particles with a diameter of 5 micrometers or less,
PM2.5: particles with a diameter of 2.5 micrometers or less, and
PM1: particles with a diameter of 1 micrometer or less.

In an embodiment, at least one of the one or more air quality sensors is configured to detect the following particle concentration: PM1, PM2.5, PM4, PM10 inside the air cleaning unit.

In an embodiment, the control system is communicatively connected to a cloud service, wherein the cloud service is configured to set the range of acceptable air quality levels.

In an embodiment, the control system is communicatively connected to a cloud service, wherein the cloud service is configured to set and/or change the predefined range of allowable $CO_2$ concentration for each building area.

In an embodiment, the control system is communicatively connected to a cloud service, wherein the cloud service is configured to set and/or change the predefined range of allowable temperature for each building area.

In an embodiment, the control system is communicatively connected to a cloud service, wherein the cloud service is configured to set and/or change the predefined range of allowable relative humidity for each building area.

In an embodiment, the control system is communicatively connected to a cloud service, wherein the cloud service is configured to set and/or change the predefined range of allowable volatile organic compounds (VOCs) for each building area.

In an embodiment, the control system is communicatively connected to a cloud service, wherein the cloud service is configured to set and/or change the predefined range of allowable ambient pressure for each building area.

In an embodiment, the control system is communicatively connected to a cloud service, wherein the cloud service is configured to set and/or change the predefined range of allowable particle concentration for each building area.

In an embodiment, the control system is configured to, on the basis of the detected data, determine if the number of air cleaning units can be changed in order to maintain the air quality within a predefined range.

In an embodiment, the control system is configured to, on the basis of the detected data, determine if the position of one or more of the air cleaning units can be changed in order to maintain the air quality within a predefined range. This may be done by arranging air cleaning units in different sections of the building areas of the building (as shown in and explained with reference to FIG. 8A, FIG. 8B and FIG. 8C). In an embodiment, the control system is configured to present this information to an administrator of the building ventilation system.

In an embodiment, the air cleaning units comprise a blower that is configured to be operated at different speeds including at least a low speed, a moderate speed and a high speed, wherein the control system is configured to, on the basis of the detected data:
   a) determine when particle and/or VOC concentrations surpass predetermined thresholds set by predefined air quality standards; and
   b) by using the control system, activating a number of the air cleaning units at the high speed.

This enables the building ventilation system to eliminate VOCs concentrations and particles.

Ultrafine particles are generated for example by candles, fine particles are generated for example from diesel engines, cigarette smoke and cooking, and coarse particles from for example carpets, walls, construction, etc. VOCs are emitted for example from furniture, walls and plants, and from humans.

Accordingly, while $CO_2$ concentrations remain below the specified threshold, the control system activates air cleaners at high speed to eliminate VOCs and particles. When the $CO_2$ concentration is low, traditional ventilation systems reduce outdoor air intake, while indoor pollutants could be higher than acceptable. This results in exposing occupants to high concentrations of air pollutants.

Another problem with traditional systems is that, in many places, the outdoors are also polluted. So, bringing air from outside does not necessarily improve air quality.

In an embodiment, the air cleaning units comprise a blower configured to be operated at different speeds including at least a low speed, a moderate speed and a high speed, wherein the control system is configured to, on the basis of the detected data:
 a) determine when particle and/or VOC concentrations hover near, but remain below, the predefined thresholds outlined by air quality standards and $CO_2$ concentrations are below the specified threshold; and
 b) by using the control system, activating a number of the air cleaning units at the moderate speed.

When $CO_2$ concentration inside a building area of the building exceeds a set threshold (typically a higher setpoint than traditional $CO_2$ setpoints), the control system increases outdoor air flow rates to diminish $CO_2$ concentrations.

Traditional Demand Controlled Ventilation (DCV) systems put the set threshold shallow to avoid the risk of high air pollutants. But this results in high energy consumption.

The building ventilation system is configured to determine:
 a) the minimum outdoor air flow rate for each building area; and
 b) the required number of air cleaners for these areas on the basis of data provided by the sensors.

In an embodiment, the control system is configured to determine the number of required air cleaning units to maintain a predefined air quality level, wherein the control system is applying information about the air cleaning effect of the one or more air handling units.

A method according to the invention is a method for ventilating a building, said method comprising applying a ventilation system comprising:
 one or more air handling units arranged and configured to receive air from outside a building comprising one or more building areas and deliver outdoor air into the building;
 a plurality of air quality sensors arranged to measure the quality of the air inside the building;
 a control system connected to the air handling units and configured to receive data from the air quality sensors, wherein the control system is configured to control the activity of the air handling units in dependency of the data from the air quality sensors,
wherein the method comprises:
 applying a plurality of air cleaning units arranged to eliminate gaseous and particulate pollutants from the air inside the building,
 controlling the air cleaning units in dependency of the data from the air quality sensors by using the control system,
wherein the control system:
 a) determines the minimum outdoor air flow rate for each building area required to meet a predefined range of allowable $CO_2$ concentration and/or temperature and/or relative humidity and/or volatile organic compounds (VOCs) and/or particle concentration for each building area,
 b) takes into consideration the cleaning effect provided by each of the air cleaning units, for each building area; and
 c) carries out a cost specific optimization of the activity of air handling units and air cleaning units.

Hereby, it is possible to provide a method for ventilating a building in a manner that reduces generation of dead zones and is more energy efficient than the prior art solutions. It is also possible to provide a method that can improve the indoor air quality.

It is an advantage that the control system:
 a) determines the minimum outdoor air flow rate for each building area required to meet a predefined range of allowable $CO_2$ concentration and/or temperature and/or relative humidity and/or volatile organic compounds (VOCs) and/or particle concentration for each building area,
 b) takes into consideration the cleaning effect provided by each of the air cleaning units, for each building area; and
 c) carries out a cost specific optimization of the activity of air handling units and air cleaning units.

In an embodiment, the method comprises:
 a) monitoring the temperature indoor ($T_{In}$) and outside ($T_{Out}$); and
 b) applying the temperature indoor ($T_{In}$) and outside ($T_{Out}$) to calculate the minimum outdoor air flow rate for each building area required to meet a predefined range of $CO_2$ concentration and/or temperature and/or relative humidity and/or volatile organic compounds (VOCs) and/or particle concentration for each building area.

In an embodiment, each air cleaning unit comprises one or more air quality sensors arranged inside the air cleaning unit.

In an embodiment, at least one of the one or more air quality sensors is configured to detect the $CO_2$ concentration and/or temperature and/or relative humidity and/or volatile organic compounds (VOCs) and/or particle concentration (e.g. fine particles and coarse particles) inside the air cleaning unit.

In an embodiment, at least one of the one or more air quality sensors comprises one or more biosensors. In an embodiment, the one or more biosensors are configured to detect virus. In an embodiment, the one or more biosensors are configured to detect mold.

In an embodiment, at least one of the one or more air quality sensors is configured to detect one or more pollutant of the following:
 PM2.5, PM5, PM10, $O_3$, $NO_2$, $SO_2$, CO.

In an embodiment, at least one of the one or more air quality sensors is configured to detect if the concentration exceeds a predefined Air Quality Standard level (e.g. the following):

| Pollutant | Averaging time | 2005 AQGs | 2021 AQG level |
|---|---|---|---|
| $PM_{2.5}$, µg/m³ | Annual | 10 | 5 |
|  | 24-hour[a] | 25 | 15 |
| $PM_{10}$, µg/m³ | Annual | 20 | 15 |
|  | 24-hour[a] | 50 | 45 |
| $O_3$, µg/m³ | Peak season[b] | — | 60 |
|  | 8-hour[a] | 100 | 100 |

-continued

| Pollutant | Averaging time | 2005 AQGs | 2021 AQG level |
|---|---|---|---|
| $NO_2$, $\mu g/m^3$ | Annual | 40 | 10 |
|  | 24-hour[a] | — | 25 |
| $SO_2$, $\mu g/m^3$ | 24-hour[a] | 20 | 40 |
| CO, $mg/m^3$ | 24-hour[a] | — | 4 | www.who.int/news-room/questions-and-answers/item/who-global-air-quality-guidelines In an embodiment, at least one of the one or more air quality sensors is configured to capture a picture or a sequence of pictures (video) and detect the number of people in a building area based on processing of the image(s) captured by the sensor. Hereby, it is possible to divide the building area, in which the sensor is placed into several patches and detect movements without detecting faces or body details.

In an embodiment, at least one of the one or more air quality sensors is configured to determine the fresh air and clean air required in a building area.

In an embodiment, the control system is communicatively connected to a cloud service, wherein the cloud service is configured to set the range of acceptable air quality levels.

In an embodiment, the control system, on the basis of the detected data, determines if the number of air cleaning units can be changed in order to maintain the air quality within a predefined range.

In an embodiment, the control system is configured to control each air cleaning unit individually on the basis of the information detected by the air quality sensors.

In an embodiment, the control system is configured to control a group of air cleaning units on the basis of the information detected by the air quality sensors, wherein each of the air cleaning units is controlled in the same manner.

In an embodiment, the method comprises determining, on the basis of the detected data, if the position of one or more of the air cleaning units can be changed in order to maintain the air quality within a predefined range.

In an embodiment, the method comprises:
a) determining when particle and/or VOC concentrations surpass predetermined thresholds set by predefined air quality standards; and
b) by using the control system activating a number of the air cleaning units at the high speed.

It may be an advantage that the air cleaning units comprise a blower configured to be operated at different speeds including at least a low speed, a moderate speed and a high speed, wherein the control system is configured to, on the basis of the detected data:
a) determine when particle and/or VOC concentrations hover near, but remain below, the predefined thresholds outlined by air quality standards and $CO_2$ concentrations are below the specified threshold; and
b) by using the control system, activate a number of the air cleaning units at the moderate speed.

In an embodiment, the method comprises determining the number of required air cleaning units to maintain a predefined air quality level, wherein the control system is applying information about the air cleaning effect of the one or more air handling units.

In an embodiment, the method comprises controlling each air cleaning unit individually on the basis of the information detected by the air quality sensors.

In an embodiment, the method comprises controlling a group of air cleaning units on the basis of the information detected by the air quality sensors, wherein each of the air cleaning units is controlled in the same manner.

In an embodiment, the method comprises:
a) determining the change of energy expenditure achieved by moving one or more air cleaning units to another position within the building; and
b) moving the one or more air cleaning units to another position within the building if energy can be saved by moving the one or more air cleaning units to the other position within the building.

When particle and/or VOC concentrations surpass predetermined thresholds set by air quality standards while $CO_2$ concentrations remain below the specified threshold, the control system activates air cleaners at high speed to eliminate VOCs and particles.

When the $CO_2$ concentration is low, traditional ventilation systems reduce outdoor air intake, while indoor pollutants could be higher than acceptable. This results in exposing occupants to high concentrations of air pollutants.

Another problem with traditional systems is that, in many places, the outdoors are also polluted. So, bringing air from outside does not necessarily improve air quality.

If particle and/or VOC concentrations hover near, but remain below, the predefined thresholds outlined by air quality standards and $CO_2$ concentrations are below the specified threshold, the control system adjusts air cleaners to run at moderate speeds to cleanse the air.

When $CO_2$ concentrations exceed a set threshold (a higher setpoint than traditional $CO_2$ setpoints), the control system increases outdoor air flow rates to diminish $CO_2$ levels. Traditional Demand Controlled Ventilation (DCV) systems put the set threshold shallow to avoid the risk of high air pollutants. But this results in high energy consumption.

BRIEF DESCRIPTION OF THE DRAWINGS

The systems and methods will become more fully understood from the detailed description given herein below. The accompanying drawings are given by way of illustration only, and thus, they are not limitative. In the accompanying drawings.

DETAILED DESCRIPTION

Figure 1:
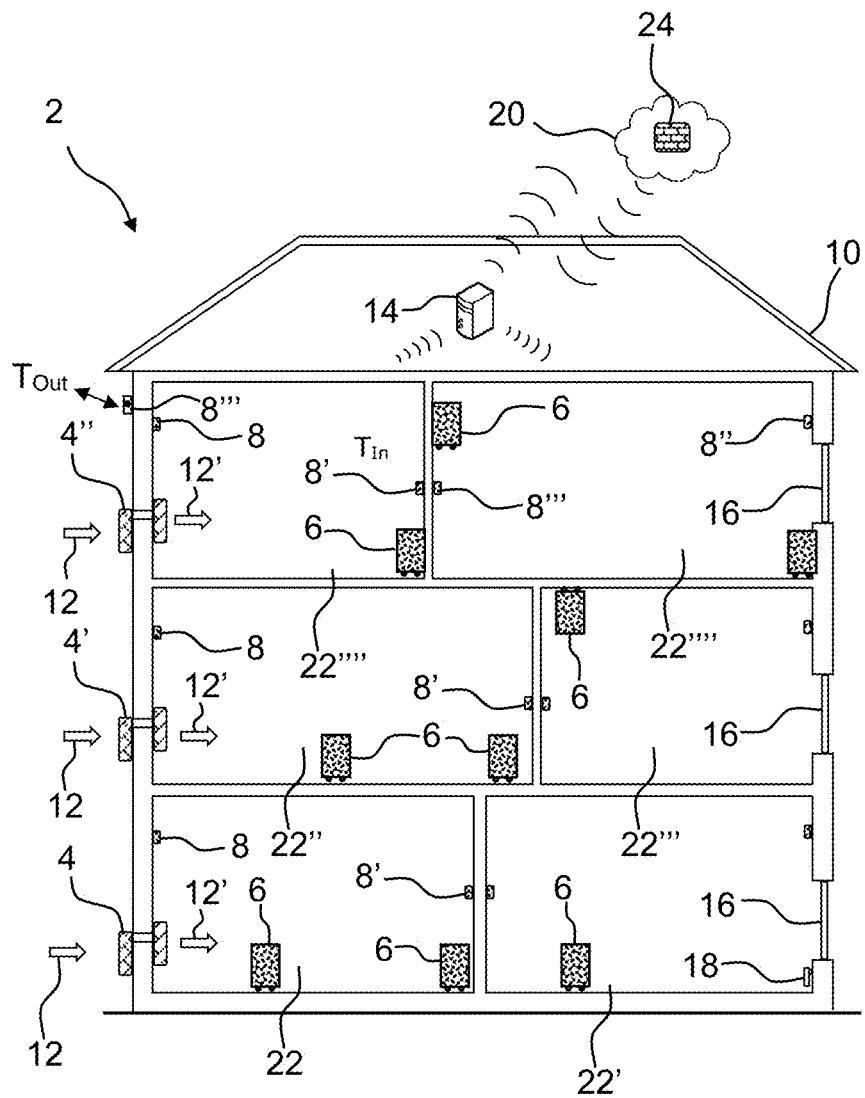
FIG. 1 shows a schematic view of a building ventilation system according to an embodiment.

Referring now in detail to the drawings for the purpose of illustrating embodiments of the present systems and methods, a building ventilation system 2 is illustrated in FIG. 1.

FIG. 1 is a schematic view of a building ventilation system 2 according to an embodiment. The building ventilation system 2 comprises several air handling units 4, 4', 4" arranged and configured to receive air 12 from outside a building 10. In an embodiment, the air handling units 4, 4', 4" are heat pumps or comprise one or more heat pumps. In an embodiment, each air handling unit 4, 4', 4" comprises an outside part and an inside part that are in fluid communication with each other.

In an embodiment, each air handling unit 4, 4', 4" is mounted on an outer wall or on the roof of the building 10. In an embodiment, the air handling unit 4, 4', 4" comprises a ventilator and a heat exchanger, wherein the ventilator is arranged and configured to suck outside air 12 into the building 10, wherein the outside air 12 passes through the heat exchanger before entering the inside of the building 10. Hereby, the heat exchanger can either cool down the outside air 12 (if the ambient temperature is higher than the indoor temperature) or heat the outside air 12 (if the indoor temperature exceeds the ambient temperature).

The indoor air 12' leaving the air handling unit 4, 4', 4" will typically have a lower concentration of $CO_2$ than the air inside the building 10 because people inside the building 10 will produce $CO_2$ (typically about 10-15 liters every hour). The building ventilation system 2 comprises one or more temperature sensors arranged and configured to detect the temperature $T_{Out}$ of the outdoor air 12. Likewise the building ventilation system 2 comprises one or more temperature sensors arranged and configured to detect the temperature $T_{In}$ of the indoor air 12'.

The building 10 comprises several building areas 22, 22', 22", 22''', 22'''' separated by walls, floor structures or ceiling structures. Typically, the building 10 comprises building areas 22, 22', 22", 22''', 22'''' of different size.

A plurality of air quality sensors 8, 8', 8" is placed inside the building areas 22, 22', 22", 22''', 22''''. The air quality sensors 8, 8', 8" are arranged to measure the quality of the air inside the building 10.

In an embodiment, at least one of the air quality sensors 8, 8', 8" is arranged to measure the $CO_2$ concentration of the indoor air 12'.

In an embodiment, at least one of the air quality sensors 8, 8', 8" is arranged to measure the relative humidity of the indoor air 12'.

In an embodiment, at least one of the air quality sensors 8, 8', 8" is arranged to measure volatile organic compounds (VOCs) of the indoor air 12'.

In an embodiment, at least one of the air quality sensors 8, 8', 8" is arranged to measure particle concentration of the indoor air 12'.

In an embodiment, at least one of the air quality sensors 8, 8', 8" is arranged to measure the temperature of the indoor air 12'.

In an embodiment, at least one quality sensor 8, 8', 8" is arranged to measure the $CO_2$ concentration and/or the relative humidity and/or the volatile organic compounds (VOCs) and/or particle concentration of the indoor air 12' of each of a predefined plurality of the building areas 22, 22', 22", 22''', 22''''.

In an embodiment, the predefined plurality of the building areas 22, 22', 22", 22''', 22'''' is all the building areas 22, 22', 22", 22''', 22''''.

The building ventilation system 2 comprises a control system 14 connected to the air handling units 4, 4', 4". Accordingly, the control system 14 is configured to turn on and switch off each of the air handling units 4, 4', 4". In an embodiment, the control system 14 is configured to regulate the outside air intake flow of each of the air handling units 4, 4', 4".

In an embodiment, the control system 14 is communicatively connected to each of the air handling units 4, 4', 4". In an embodiment, the control system 14 is electrically connected to each of the air handling units 4, 4', 4".

In an embodiment, the control system 14 comprises a computer provided with a processer configured to receive data from the air quality sensors 8, 8', 8" and process said data.

In an embodiment, the control system 14 is configured to receive data from external sources (e.g. a temperature sensor arranged outside).

In an embodiment, the control system 14 is communicatively connected to the Internet 20. In an embodiment, the control system 14 is communicatively connected to a cloud service 24 via the internet 20.

In an embodiment, calculations are carried out on edge rather than just the cloud. In an embodiment, the air cleaning units are configured to carry out calculations locally and take action. In an embodiment, the air cleaning units are configured to carry out calculations locally based on settings defined on the cloud service.

In an embodiment, the cloud service 24 is configured to receive and process data from the building ventilation system 2. Accordingly, the cloud service 24 can conduct calculations and send instructions to the building ventilation system 2. Thus, the control system 14 can control the building ventilation system 2 by using the cloud service 24.

The control system 14 is configured to receive data from the air quality sensors 8, 8', 8" and to control the activity of the air handling units 4, 4', 4" in dependency of the data from the air quality sensors 8, 8', 8".

The building ventilation system 2 comprises a plurality of air cleaning units 6 arranged to eliminate gaseous and particulate pollutants from the air 12' inside the building 10.

In an embodiment, the air cleaning units 6 are portable. Accordingly, the air cleaning units 6 can be moved within each building area 22, 22', 22", 22''', 22''''. The air cleaning units 6 can be either placed on the floor, mounted on a wall or on the ceiling.

The control system 14 is configured to control the air cleaning units 6 in dependency of the data from the air quality sensors 8, 8', 8". Since each air cleaning unit 6 is configured to clean indoor air 12', it is possible to maintain a predefined required indoor air quality (e.g. a $CO_2$ concentration below 0.1%) in a manner in which the air handling units 4, 4', 4" blow less outdoor air 12 into the building 10 than in the prior art. In some situations it may even be possible to maintain a predefined required indoor air quality (e.g. a $CO_2$ concentration below 0.1%) without using the air handling units 4, 4', 4".

Since each air cleaning unit 6 cleans indoor air 12' without changing the temperature of the air (there is no temperature difference between the indoor air 12' entering the air cleaning units 6 and the cleaned indoor air 12' leaving the air cleaning units 6), the use of the air cleaning units 6 introduces no energy loss due to air temperature differences that occur when the air handling units 4, 4', 4" blow outdoor air 12 into the building 10.

The control system 14 is configured to take into consideration the cleaning effect provided by each of the air cleaning units 6 for each building area 22, 22', 22", 22''', 22''''. Accordingly, the control system 14 can minimize the energy consumption by:

a) using the air cleaning units 6; and
b) reducing the outside air flow into the building 10 provided by the air handling units 4, 4', 4".

In an embodiment, one or more air quality sensors are arranged inside the air cleaning units 6.

In an embodiment, the control system 14 is configured to calculate the minimum outdoor air flow rate for each building area 22, 22', 22", 22''', 22'''' required to meet a predefined range of allowable $CO_2$ concentration and/or temperature and/or relative humidity and/or volatile organic compounds (VOCs) and/or particle concentration for each building area 22, 22', 22", 22''', 22''''.

The control system 14 is configured to take into consideration the cleaning effect provided by each of the air cleaning units 6 for each building area 22, 22', 22", 22''', 22''''. Hereby, the control system 14 can determine if the air cleaning units 6 can provide a sufficient purification for each building area 22, 22', 22", 22''', 22'''' or if the air handling units should be activated in order to introduce outside air into the building 10.

The building 10 comprises windows 16 and a heating unit 18.

Figure 2:
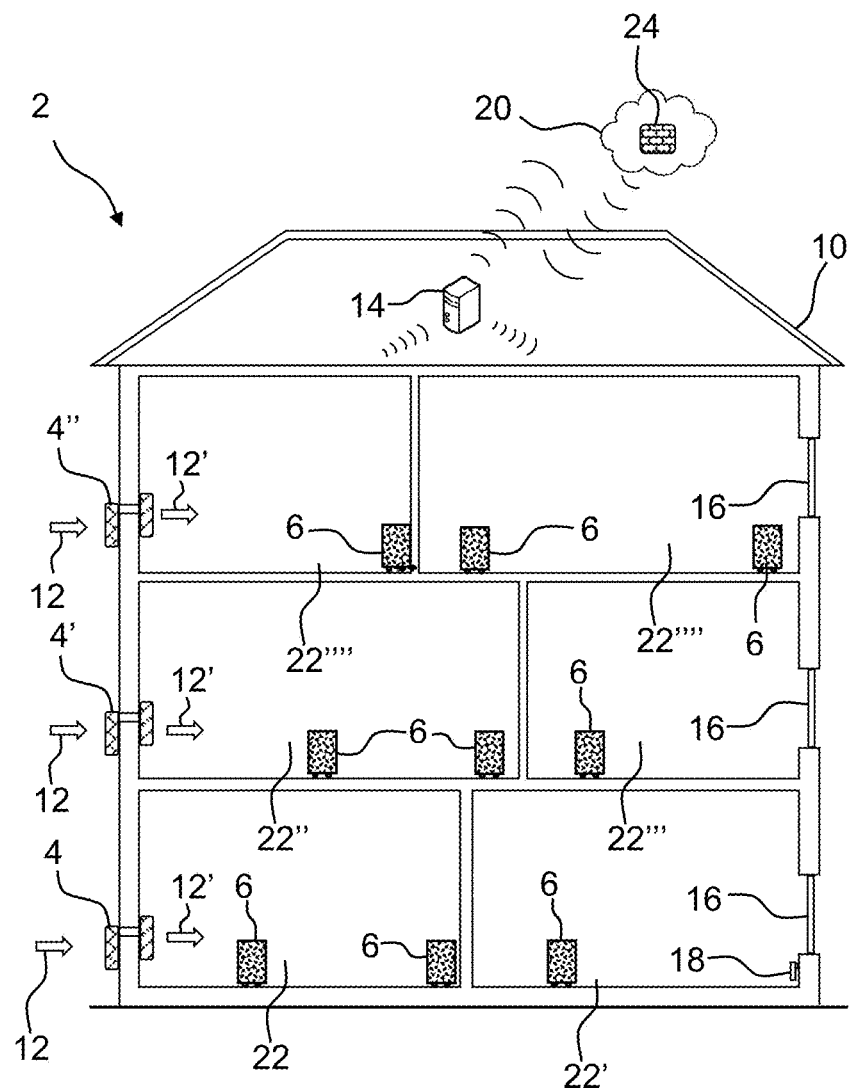
FIG. 2 shows a schematic side view of another building ventilation system according to an embodiment.

FIG. 2 illustrates a schematic side view of a building ventilation system 2 according to an embodiment. The building ventilation system 2 basically corresponds to the one shown in and explained with reference to FIG. 1. There are, however, no air quality sensors placed on walls, ceiling or floor of any of the building areas 22, 22', 22", 22''', 22''''. Instead, air quality sensors are integrated in the air cleaning units 6. The air cleaning units 6 are placed on the floor. The air cleaning units 6 may, however, be mounted on a wall or on the ceiling. In an embodiment, one or more air quality sensors is placed inside the housing of each air cleaning unit 6. In an embodiment, two or more air quality sensors are placed inside the housing of each air cleaning unit 6.

In an embodiment, the building ventilation system 2 comprises air quality sensors placed on or attached to walls, ceiling or floor of the building areas 22, 22', 22", 22''', 22'''' as well as air quality sensors integrated in the air cleaning units 6.

Figure 3:
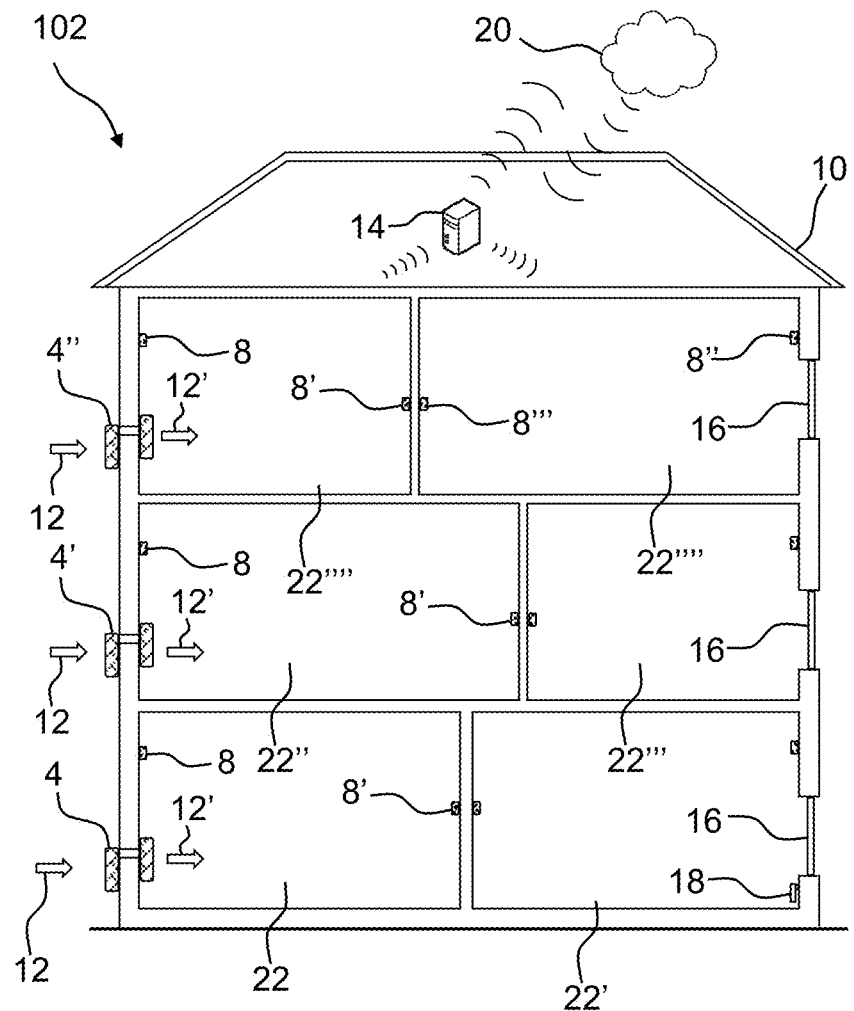
FIG. 3 shows a schematic view of a prior art building ventilation system.

FIG. 3 illustrates a schematic side view of a prior art building ventilation system 102. The prior art building ventilation system 102 comprises the same features as the building ventilation system 2 shown in FIG. 1 except for the air cleaning units.

Since the prior art building ventilation system 102 comprises no air cleaning units, the prior art building ventilation system 102 can only reduce the concentration of $CO_2$ and other unwanted contents of the indoor air 12' by using the air handling units 4, 4', 4". Due to the temperature difference between the outside air 12 and the inside air, it is required to use energy to heat or cool the outside air being introduced by the air handling units 4, 4', 4".

Calculating Thermal Energy Changes

The amount of thermal energy stored or released due to a temperature change can be calculated using the equation:

$$\text{change in thermal energy} = \text{mass} \times \text{specific heat capacity} \times \text{temperature change} \qquad 1)$$

$$\Delta E = m \times c \, \Delta\theta, \qquad 2)$$

where
  $\Delta E$ is the change in thermal energy measured in Joules (J);
  m is the mass measured in kilograms (kg);
  c is the specific heat capacity measured in joules per kilogram per degree Celsius (J/kg °C.)
  $\Delta\theta$ is the temperature difference measured in degree Celsius (°C.).

The specific heat capacity for air at 20°C. is 1003.5 J/kg °C. Accordingly, the change in thermal energy $\Delta E$ for 1 m³ air (at 101.325 kPa and 20°C., the density is approximately 1.2 kg/m³) that is heated or cooled 10°C. is given by:

$$\Delta E = m \times c \, \Delta\theta = 1.2 \text{ kg/m}^3 \times 1003.5 \text{ J/kg °C.} \times 10° \text{C.} = 12.04 \text{ KJ/m}^3. \qquad 3)$$

Figure 4:
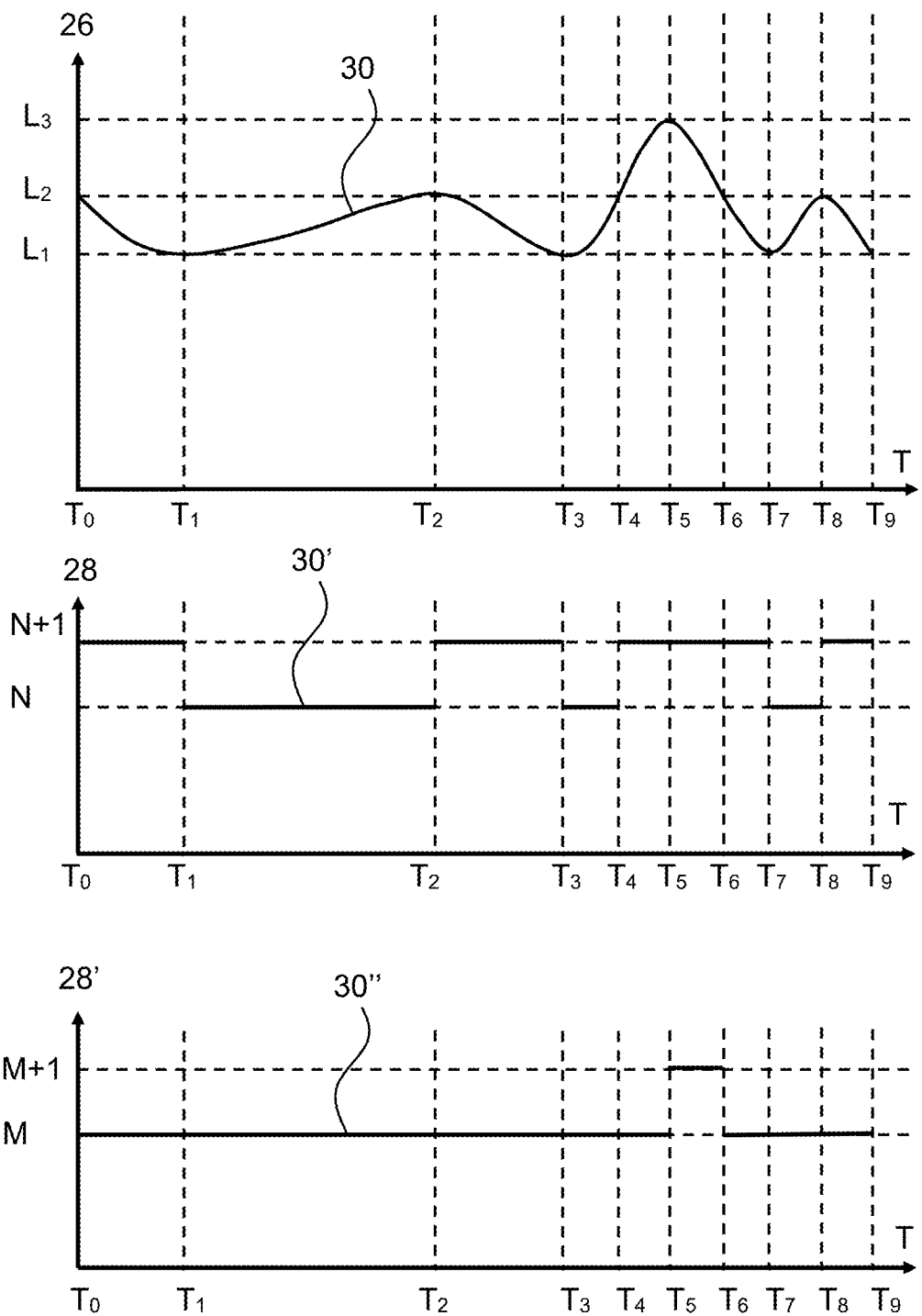
FIG. 4 shows an example of a sequence of a building ventilation system.

FIG. 4 illustrates the curves 30, 30', 30" showing how a building ventilation system according to an embodiment can be controlled. The first curve 30 illustrates an indoor air quality quantity 26 (e.g. $CO_2$ concentration) plotted as a function of time T.

The second curve 30' illustrates the activity 28 of the air cleaning units of the building ventilation system plotted as a function of time T. In an embodiment, the activity 28 of the air cleaning units is the number of active air cleaning units. In an embodiment, the activity 28 of the air cleaning units is energy consumption of the active air cleaning units. In an embodiment, the activity 28 of the air cleaning units is the flow generated by the active air cleaning units.

The third curve 30" illustrates the activity 28' of the air handling units plotted as a function of time T. In an embodiment, the activity 28' of the air handling units is the number of active air handling units. In an embodiment, the activity 28' of the air handling units is energy consumption of the active air handling units. In an embodiment, the activity 28' of the air handling units is the flow generated by the active air handling units.

At time $T_0$ the indoor air quality quantity 26 is at a second level $L_2$, the activity 28 of the air cleaning units is N+1 (e.g. N+1 active air cleaning units) while the activity 28' of the air handling units is M (e.g. N active air handling units).

The indoor air quality quantity 26 falls to a first level $L_1$ at time $T_1$. At time $T_1$ the indoor air quality quantity 26 has reached a lower level of a predefined indoor air quality quantity range. Accordingly, the activity 28 of the air cleaning units is reduced to N (e.g. N active air cleaning units) while the activity 28' of the air handling units is maintained on the level M.

From time $T_1$ to $T_2$ the indoor air quality quantity 26 increases to second level $L_2$ corresponding to an upper level of a predefined indoor air quality quantity range. At time $T_2$ the activity 28 of the air cleaning units is increased to N+1 to decrease the indoor air quality quantity 26. At time $T_2$ the activity 28' of the air handling units is maintained on the level M.

From time $T_2$ to $T_3$ the indoor air quality quantity 26 is reduced from the second level $L_2$ to the first level $L_1$. At time $T_3$ the indoor air quality quantity 26 has reached the lower level of a predefined indoor air quality quantity range again. Therefore, the activity 28 of the air cleaning units is reduced to N. The activity 28' of the air handling units is, however, maintained on the level M.

From time $T_3$ to $T_4$ the indoor air quality quantity 26 increases to second level $L_2$ corresponding to the upper level of the predefined indoor air quality quantity range. At time $T_4$ the activity 28 of the air cleaning units is increased to N+1 to decrease the indoor air quality quantity 26. At time $T_2$ the activity 28' of the air handling units is maintained on the level M.

From time $T_4$ to $T_5$ the indoor air quality quantity 26 increases to third level $L_3$ higher than the upper level of the predefined indoor air quality quantity range. At time $T_5$ the activity 28 of the air cleaning units is maintained on N+1 (in an embodiment this is the upper level of the air cleaning units) to decrease the indoor air quality quantity 26. At time $T_5$ the activity 28' of the air handling units is increased to the level M+1 because the slope of the curve 30 is higher than a predefined slope level at time $T_5$.

From time $T_5$ to $T_6$ the indoor air quality quantity 26 is reduced to the second level $L_2$. To further reduce the indoor air quality quantity 26 level, the activity 28 of the air cleaning units is maintained on the level N+1 at time $T_6$. The activity 28' of the air handling units is, however, reduced to the level M because the predefined indoor air quality quantity range.

From time $T_6$ to $T_7$ the indoor air quality quantity 26 is reduced from the second level $L_2$ to the first level $L_1$. At time $T_7$ the indoor air quality quantity 26 has reached the lower level of a predefined indoor air quality quantity range again. Therefore, the activity 28 of the air cleaning units is reduced to N. The activity 28' of the air handling units is, however, maintained on the level M.

From time $T_7$ to $T_8$ the indoor air quality quantity 26 increases to second level $L_2$ corresponding to the upper level of the predefined indoor air quality quantity range. At time $T_8$ the activity 28 of the air cleaning units is increased to N+1 to decrease the indoor air quality quantity 26. At time $T_2$ the activity 28' of the air handling units is maintained on the level M.

From time $T_8$ to $T_9$ the indoor air quality quantity 26 is reduced from the second level $L_2$ to the first level $L_1$. At time $T_7$ the indoor air quality quantity 26 has reached the lower level of a predefined indoor air quality quantity range again. Therefore, the activity 28 of the air cleaning units is reduced to N. The activity 28' of the air handling units is, however, maintained on the level M.

Figure 5:
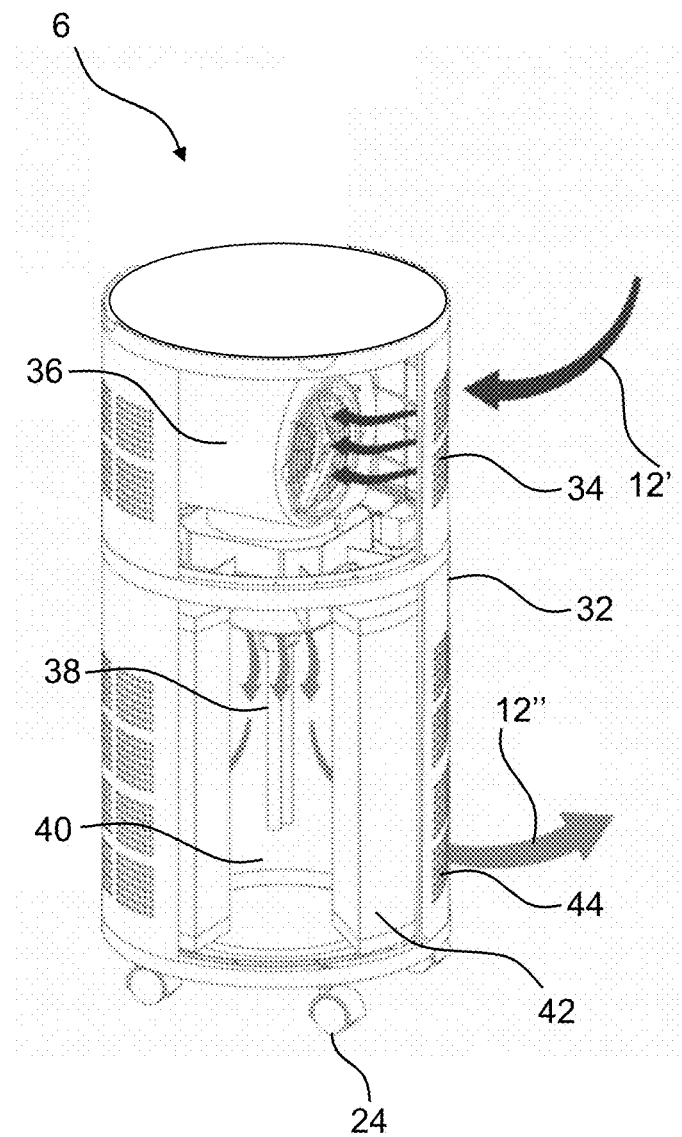
FIG. 5 shows an air cleaning unit of a building ventilation system according to an embodiment.

FIG. 5 illustrates an air cleaning unit 6 of a building ventilation system according to an embodiment. The air cleaning unit 6 comprises a housing 32. An air intake section 34 is provided in the upper end of the housing 32. A blower 36 is arranged in the upper portion of the housing 32. The blower 36 is arranged and configured to suck indoor air 12' into the housing 32 via the intake section 34. The blower 36 may be an axial fan designed to cause intake air 12' to flow through the blower 36 in an axial direction, parallel to the shaft about which the blades of the blower 36 rotate. In an embodiment, the blower 36 has a horizontally orientated intake portion and a vertical output portion so that air 12' pressurized by the blower 36 leaves the blower 36 in a downwardly vertical direction.

The air cleaning unit 6 comprises an ultraviolet (UV) lamp 38 arranged and configured to illuminate the air 12' flowing through the inner space 40 of the lower portion of the housing 32.

The air cleaning unit 6 comprises a filter 42 arranged and configured to filter the air 12'. In an embodiment, the inner space 40 is defined by an enclosing cylindrical high-efficiency particulate air (HEPA) filter.

In an embodiment, the UV lamp 38 is a germicidal lamp (an ultraviolet C lamp). This may be an advantage since ultraviolet C light (wherein the wavelength is in the range of 100 to 280 nm) is capable of destroying and thus inactivating bacteria, viruses, and protozoa.

The UV lamp 38 is arranged to irradiate the intake air 12' flowing into the inner space 40 of the bottom portion of the housing 32. Accordingly, the UV lamp 38 is capable of disinfecting the intake air 12' flowing into the inner space 40 of the bottom portion of the housing 32.

The air 12' leaves the air cleaning device 6 through the filter 42 and the air outlet section 44.

In an embodiment, the air cleaning unit 6 comprises a coarse filter adapted to prevent objects larger than a predefined size (e.g. 5 or 20 μm) to enter the housing 32.

In an embodiment, a plurality of air inlet perforations are provided in the outer surface of the upper portion of the housing 32.

Figure 6:
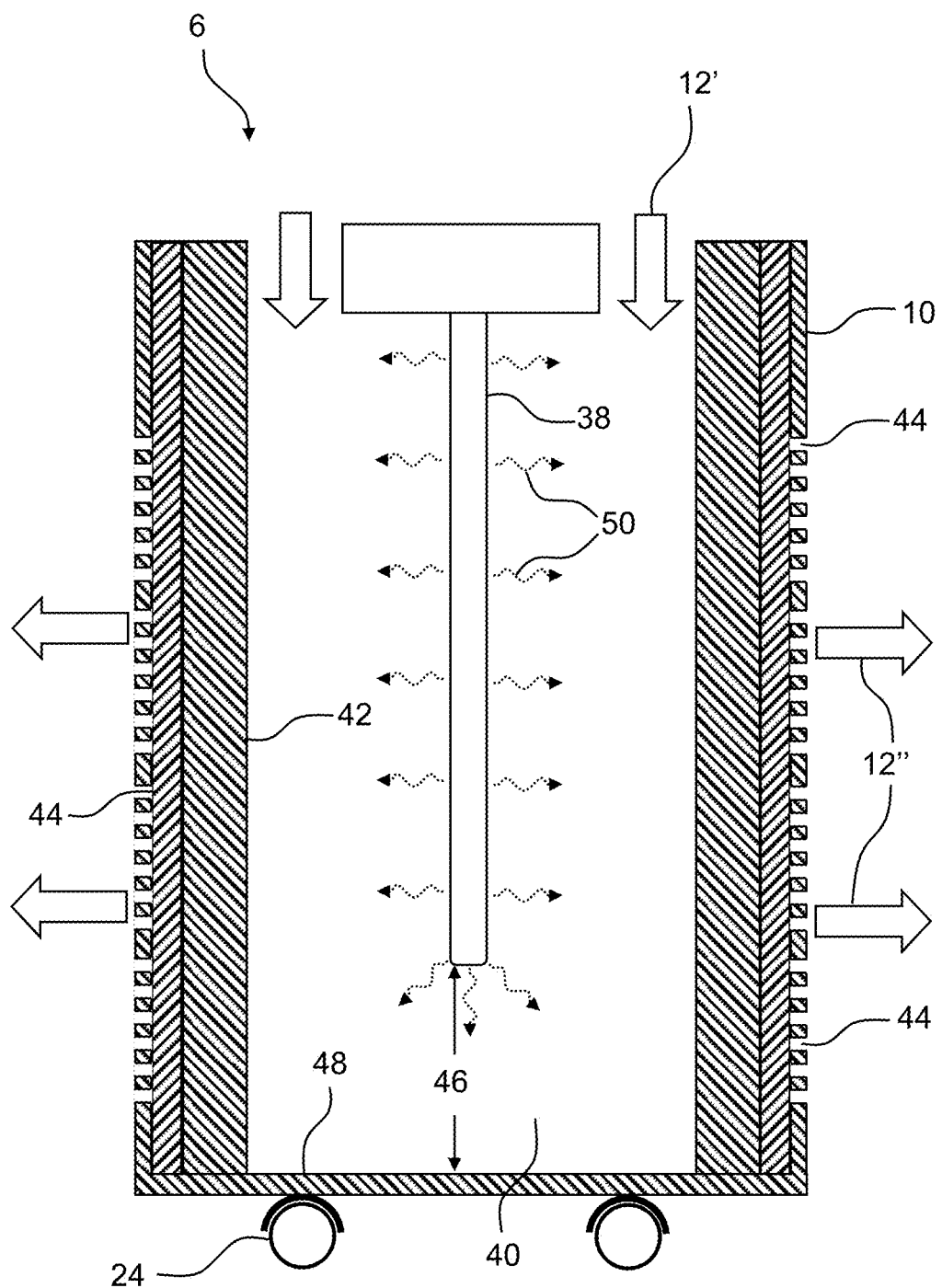
FIG. 6 shows an air cleaning unit of a building ventilation system according to an embodiment.

FIG. 6 illustrates an air cleaning unit 6 of a building ventilation system according to an embodiment. The air cleaning unit 6 comprises a housing having an inner space 40 configured to receive air 12'. An UV lamp 38 is arranged to illuminate the air 12' inside the inner space 40 of the housing. The light 50 illuminated by the lamp 38 is indicated.

The distal end of the UV lamp 38 is provided a non-zero distance 46 from the bottom 48 of the housing.

The cleaned air 12" leaves the housing through a filter 42 defining the inner space 40 of the housing and an air outlet section 44 provided in the housing.

Figure 7A:
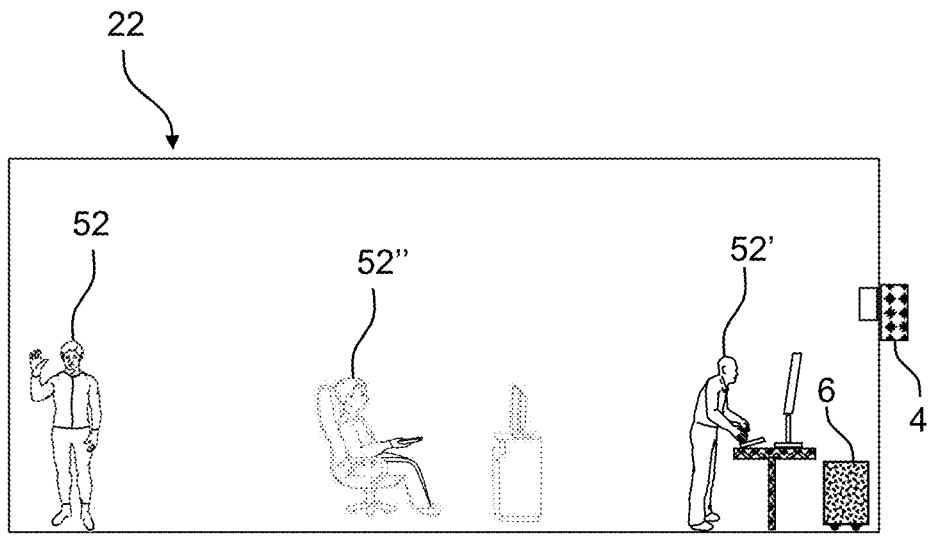
FIG. 7A shows a building ventilation system according to an embodiment in a first configuration.

FIG. 7A illustrates a building area 22 of a building ventilation system according to an embodiment in a first configuration. Three persons 52, 52', 52" are inside the building area 22. A single air cleaning unit 6 is arranged in the building area 22. An air handling unit 4 is arranged and configured to receive air from outside and deliver outdoor air into the building area 22. Since there are only three persons 52, 52', 52" inside the building area 22, the air cleaning capacity of the air cleaning unit 6 and the air handling unit 4 is sufficiently large to keep the air quality within the building area 22 within a predefined air quality range.

Figure 7B:
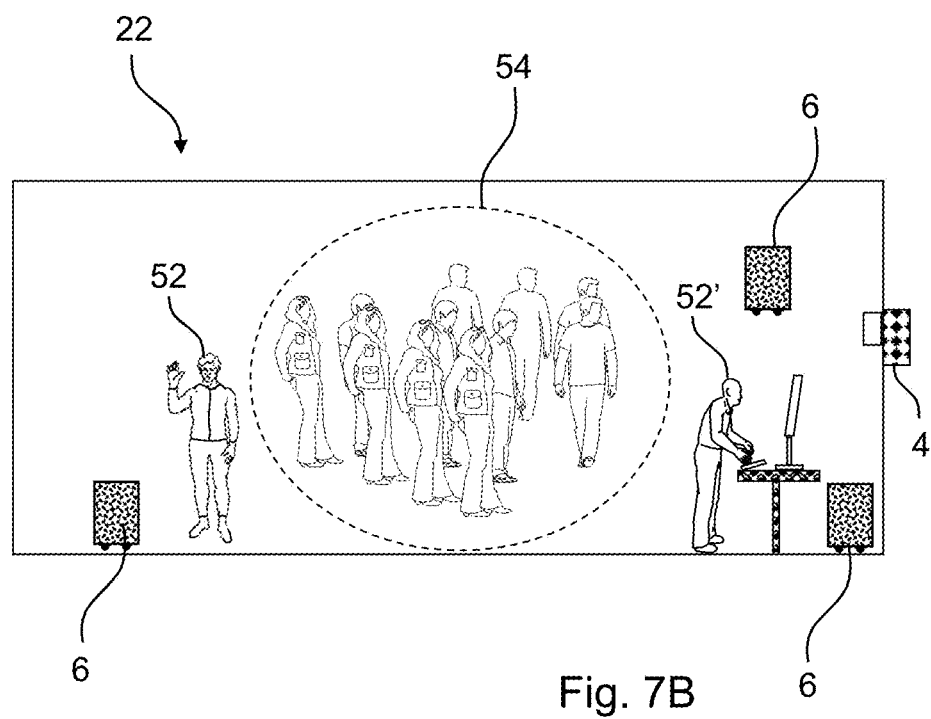
FIG. 7B shows a building ventilation system according to an embodiment in a second configuration.

FIG. 7B illustrates the building area 22 shown in FIG. 7A in another configuration. A first person 52, a third person 52" and large group of people 54 are inside the building area 22 on a daily basis. Since the number of people inside the building area 22 is much larger, the air cleaning capacity required to keep the air quality within the building area 22 within the predefined air quality range is much larger than when only three people are inside the building area 22 (as shown in and explained with reference to FIG. 7A). Accordingly, the number of air cleaning units 6 is higher. In an embodiment, each air cleaning unit 6 is configured to detect the air quality and send information (data) to a control system of the building ventilation system according to an embodiment. Accordingly, the control system can inform the administrator(s) of the building ventilation system to increase the number of cleaning units 6.

If the number of persons decreases, the air cleaning unit 6 will detect the air quality and inform the administrator(s) of the building ventilation system that the number of cleaning units 6 can be reduced because the air cleaning capacity of the air cleaning units 6 and the air handling unit 4 is sufficiently large to keep the air quality within the building area 22 within a predefined air quality range even when the number of cleaning units 6 is reduced. Accordingly, if the number of people inside the building area 22 is reduced on a daily basis, the control system can inform the administrator(s) of the building ventilation system to increase the number of cleaning units 6 to two or one depending on the air quality detected by the air cleaning unit(s) 6.

Figure 8A:
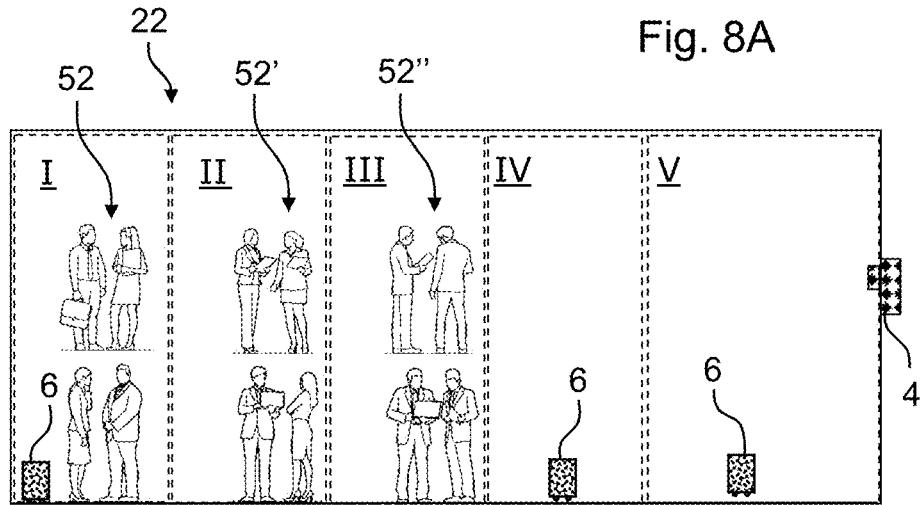
FIG. 8A shows a building ventilation system according to an embodiment in a first configuration.

FIG. 8A illustrates a building area 22 of a building ventilation system according to an embodiment in a first configuration. The building area 22 comprises sections I, II, III, IV, V. The building area 22 comprises three air cleaning units 6 and an air handling unit 4. The air handling unit 4 is arranged and configured to receive air from outside and deliver outdoor air into the building area 22.

A first air cleaning unit 6 is arranged in the first section I. A first group of persons 52 are located in the first section I. A group of persons 52' are located in the second section II. A third group of persons 52" are located in the third section III. In the fourth section IV a second air cleaning unit 6 is placed. There are, however, no persons in the fourth section IV. In the fifth section V a third air cleaning unit 6 is placed. There are no persons in the fifth section V. Due to the high concentration of persons 52, 52', 52" in the three first sections I, II, III, the first air cleaning unit 6 (arranged in the first section I) will detect a high level of $CO_2$. Since there are no persons in the fourth section IV and in the fifth section V, the second air cleaning unit 6 (arranged in the fourth section IV) will detect a lower level of $CO_2$ than the first air cleaning unit 6 (arranged in the first section I). The third air cleaning unit 6 (arranged in the fifth section V) will detect a level of $CO_2$ that is even lower than the level of $CO_2$ detected by the second air cleaning unit 6 (arranged in the fourth section IV). Accordingly, since the control system of the building system receives data from the air cleaning units 6, the control system detects and presents to the administrator of the building ventilation system that the capacity of the second and third air cleaning units 6 can be used better if the second and third air cleaning units 6 are moved to the second section II and the third section III, respectively like shown in FIG. 8B.

Figure 8B:
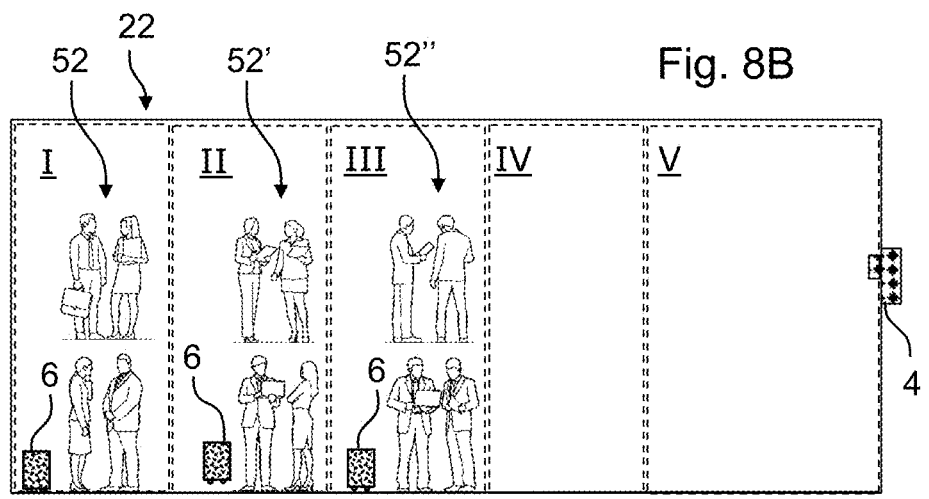
FIG. 8B shows the building ventilation system shown in FIG. 8A.
Figure 8C:
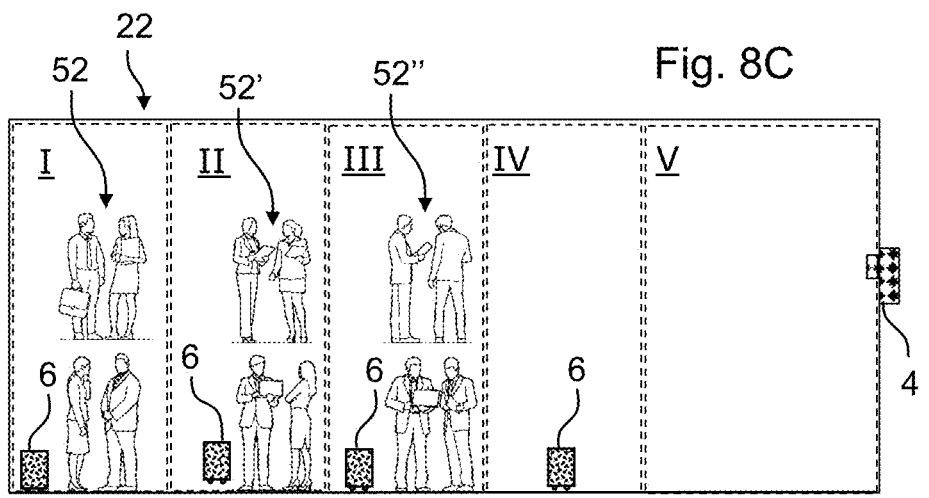
FIG. 8C shows the building ventilation system shown in FIG. 8A.

FIG. 8C illustrates the building area 22 shown in FIG. 8B, wherein an additional air cleaning unit 6 has been added and placed in the fourth section IV.

Figure 9:
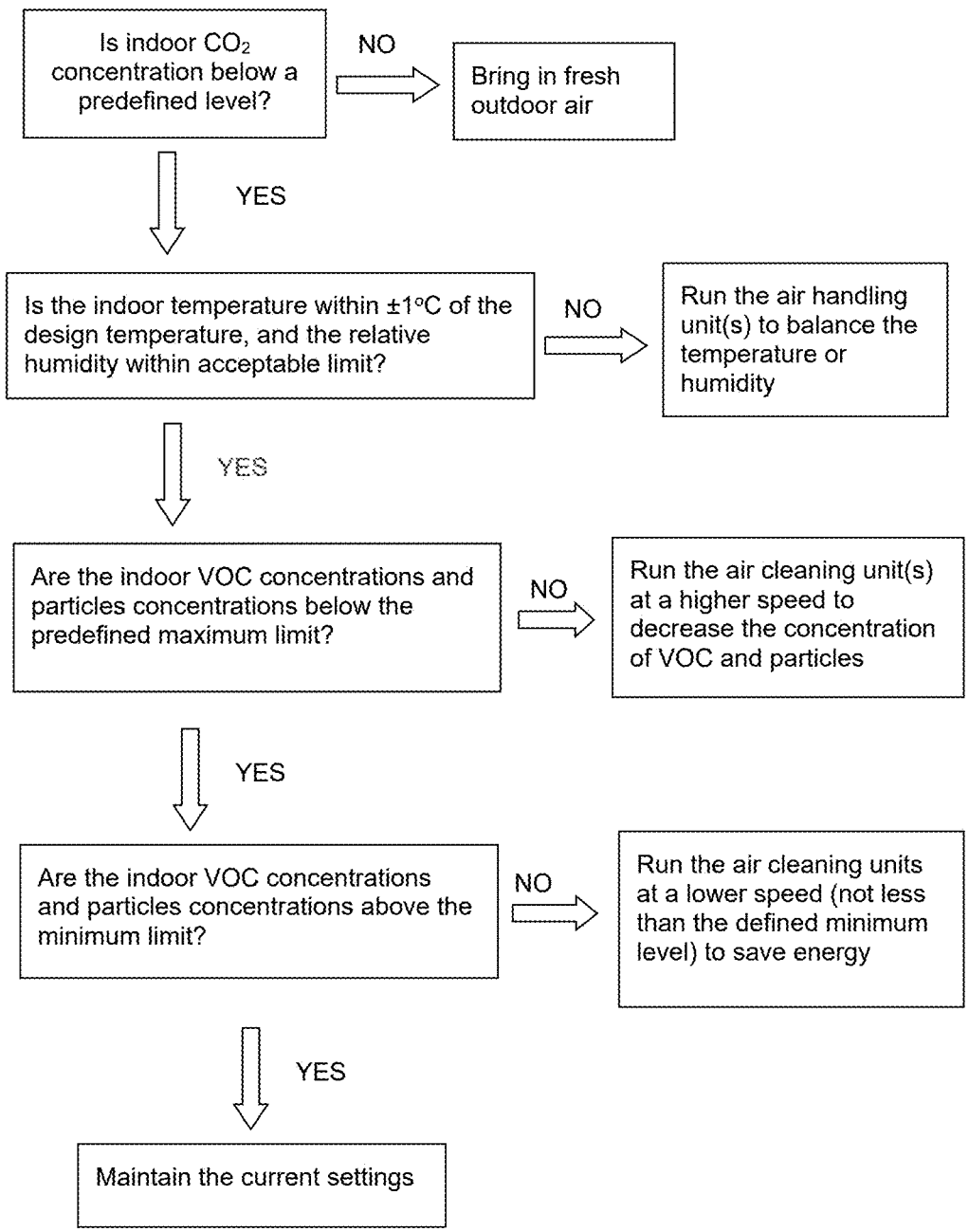
FIG. 9 shows a flowchart indicating an example of how the control system can control a building ventilation system according to an embodiment.

FIG. 9 illustrates a flowchart indicating an example of how the control system controls a building ventilation system according to an embodiment installed in a building. Initially the control system determines if the indoor $CO_2$ concentration is below a predefined indoor $CO_2$ concentration level. In an embodiment, the predefined indoor $CO_2$ concentration level is 1,000 PPM (corresponding to 0.1-0.2%). The normal outside $CO_2$ concentration is 400 PPM (corresponding to 0.04%).

In an embodiment, the control system determines the indoor $CO_2$ concentration by using sensors placed in air cleaning units. It is, however, also possible to apply sensors that are placed in the building areas (e.g. mounted on walls or ceilings).

If the control system determines an indoor $CO_2$ concentration that exceeds the predefined indoor $CO_2$ concentration level, fresh outside air will be introduced to the building. This may be done by activating one or more air handling units.

If the control system determines an indoor $CO_2$ concentration below the predefined indoor $CO_2$ concentration level, the control system will determine if the indoor temperature is within ±1° C. of the design temperature and the relative humidity is within an acceptable limit.

In an embodiment, the design temperature is within the range 20-22° C. In an embodiment, the design temperature is within the range 20-21° C. In an embodiment, the acceptable limit of the relative humidity is 30% and 50%. In an embodiment, the acceptable limit of the relative humidity is 40% and 60%.

If the control system determines that:
 a) the indoor temperature is not within ±1° C. of the design temperature or
 b) the relative humidity is not within the acceptable limit,
the control system will activate one or more of the air handling units to balance the temperature or humidity.

If, on the other hand, the control system determines that:
 a) the indoor temperature is within ±1° C. of the design temperature and
 b) the relative humidity is within the acceptable limit,
the control system will determine if:
 c) the indoor air VOC concentrations are below a predefined maximum VOC concentration limit and
 d) the particles concentrations are below predefined maximum particle concentration limits.

If the c) the indoor air VOC concentrations exceed the predefined maximum VOC concentration limit or d) the particles concentrations exceed the predefined maximum particle concentration limits, the control system will activate one or more of the air cleaning units and/or increase the speed (flow provided by) the one or more air cleaning unit. Hereby, the one or more air cleaning units will filter the indoor air and decrease the concentration of VOC and particles.

If, on the other hand, the indoor air VOC concentrations are below the predefined maximum VOC concentration limit and d) the particles concentrations are below the predefined maximum particle concentration limits, the control system will once again determine if:
 c) the indoor air VOC concentrations are below a predefined minimum VOC concentration limit and
 d) the particles concentrations are below predefined minimum particle concentration limits.

If the c) the indoor air VOC concentrations exceed the predefined minimum VOC concentration limit or d) the particles concentrations exceed the predefined minimum particle concentration limits, the control system will activate one or more of the air cleaning units and/or set the speed (flow provided by) to a lower speed (not less than a defined minimum speed level) of the one or more air cleaning units. Hereby, the one or more air cleaning units will filter the indoor air at a low speed (to save energy) and decrease the concentration of VOC and particles.

If, on the other hand, c) the indoor air VOC concentrations are below the predefined minimum VOC concentration limit and d) the particles concentrations are below the predefined minimum particle concentration limits, the control system will not initiate any changes.

LIST OF REFERENCE NUMERALS

2 Building ventilation system
4, 4', 4" Air handling unit 6, 6', 6", 6''' Air cleaning unit
8, 8', 8", 8''' Air quality sensor
10 Building
12 Air from outside
12' Air from inside the building
14 Control system
16 Window
18 Heating unit
20 Internet
22, 22', 22" Building area
22''', 22'''' Building area
24 Cloud service
26 Indoor air quality quantity (e.g. $CO_2$ content)
28 Air cleaning unit activity
28' Air handling unit activity
30, 30', 30" Curve
32 Housing
34 Air intake section
36 Blower
38 UV lamp
40 Inner space
42 Filter
44 Air outlet section
46 Non-zero distance
48 Bottom
50 UV-Light
52, 52', 52" Person
54 Group of people
102 Prior art building ventilation system
T, $T_0$, $T_1$, $T_2$ Time
$T_3$, $T_4$, $T_5$, $T_6$ Time
$T_7$, $T_8$, $T_9$ Time
N, N+1 Number or activity level of active air cleaning units
M, M+1 Number or activity level of air handling units
$L_1$, $L_2$, $L_3$ Level
I, II, III Section of a building area
IV, V Section of a building area

What is claimed is:

1. A building ventilation system for a building comprising one or more building areas, the building ventilation system comprising:
   one or more air handling units arranged and configured to receive outdoor air from outside the building and deliver the outdoor air into the building;
   a plurality of air quality sensors arranged to measure the quality of the air inside the building;
   a control system connected to the air handling units and configured to receive data from the air quality sensors, wherein the control system is configured to control activity of the air handling units in dependency of the data from the air quality sensors,
   a plurality of air cleaning units distributed within the building and arranged to eliminate gaseous and particulate pollutants from the air inside the building, each air cleaning unit physically separate from and not integrated into any of the air handling units, wherein the control system is configured to:
   (i) independently control the air cleaning units separately from the air handling units in dependency of the data from the air quality sensors;
   (ii) calculate the minimum outdoor air flow rate for each building area required to meet a predefined range of allowable $CO_2$ concentration and/or temperature and/or relative humidity and/or volatile organic compounds (VOCs) and/or particle concentration for each building area;
   (iii) determine a cleaning effect provided by each of the air cleaning units for each building area, the cleaning effect being provided by each of the air cleaning units operating independently of the air handling units;
   (iv) for each building area, determine a lowest energy cost of operating the one or more air handling units to provide the minimum outdoor air flow rate and/or one or more of the plurality of air cleaning units to achieve the cleaning effect necessary to meet the predefined range; and
   (v) instruct the one or more air handling units and/or the plurality of air cleaning units to operate in a manner that achieves the lowest energy cost.

2. The building ventilation system according to claim 1, wherein the building ventilation system is configured to monitor a temperature indoor ($T_{in}$) and outside ($T_{out}$) wherein the control system is configured to use the temperature indoor ($T_{in}$) and outside ($T_{out}$) to calculate a minimum outdoor air flow rate for each building area required to meet a predefined range of $CO_2$ concentration and/or temperature and/or relative humidity and/or volatile organic compounds (VOCs) and/or particle concentration for each building area.

3. The building ventilation system according to claim 1, wherein each air cleaning unit comprises one or more air quality sensors arranged inside the air cleaning unit.

4. The building ventilation system according to claim 3, wherein at least one of the one or more air quality sensors is configured to detect the $CO_2$ concentration and/or temperature and/or relative humidity and/or volatile organic compounds (VOCs) and/or particle concentration inside the air cleaning unit.

5. The building ventilation system according to claim 1, wherein the control system is communicatively connected to a cloud service, wherein the cloud service is configured to set a range of acceptable air quality levels.

6. The building ventilation system according to claim 1, wherein the control system is configured to, on the basis of the data, determine if the number of air cleaning units can be changed in order to maintain the air quality within the predefined range.

7. The building ventilation system according to claim 1, wherein the control system is configured to, on the basis of the data, determine if a position of one or more of the air cleaning units can be changed in order to maintain the air quality within the predefined range.

8. The building ventilation system according to claim 1, wherein each of the air cleaning units comprises a blower configured to be operated at different speeds including at least a low speed, a moderate speed and a high speed, wherein the control system is configured to, on the basis of the data:
   a) determine when particle and/or VOC concentrations surpass predetermined thresholds set by predefined air quality standards; and
   b) by using the control system, activate a number of the air cleaning units at the high speed.

9. The building ventilation system according to claim 1, wherein each of the air cleaning units comprises a blower configured to be operated at different speeds including at least a low speed, a moderate speed and a high speed, wherein the control system is configured to, on the basis of the data:
   a) determine when particle and/or VOC concentrations are above minimum limits and below predefined thresholds outlined by air quality standards and $CO_2$ concentrations are below the predefined thresholds; and b) by using the control system, activate a number of the air cleaning units at the moderate speed.

10. The building ventilation system according to claim 1, wherein the control system is configured to determine a number of required air cleaning units to maintain a predefined air quality level, wherein the control unit is applying information about the cleaning effect of the one or more air handling units.

11. A method for ventilating a building, said method comprising:
applying a ventilation system comprising:
one or more air handling units arranged and configured to receive air from outside a building comprising one or more building areas and deliver outdoor air into the building;
a plurality of air quality sensors arranged to measure quality of the air inside the building;
a control system connected to the air handling units and configured to receive data from the air quality sensors, wherein the control system is configured to control activity of the air handling units in dependency of the data from the air quality sensors,
applying a plurality of air cleaning units distributed within the building and arranged to eliminate gaseous and particulate pollutants from the air inside the building, each air cleaning unit physically separate from and not integrated into any of the air handling units;
independently controlling the air cleaning units separately from the air handling units in dependency of the data from the air quality sensors by using the control system, wherein the control system:
a) determines a minimum outdoor air flow rate for each building area required to meet a predefined range of allowable $CO_2$ concentration and/or temperature and/or relative humidity and/or volatile organic compounds (VOCs) and/or particle concentration for each building area;
b) determines a cleaning effect provided by each of the air cleaning units for each building area, the cleaning effect being provided by each of the air cleaning units operating independently of the air handling units;
c) for each building area, determines a lowest energy cost of operating the one or more air handling units to provide the minimum outdoor air flow rate and/or one or more of the plurality of air cleaning units to achieve the cleaning effect necessary to meet the predefined range; and
d) instructs the one or more air handling units and/or the plurality of air cleaning units to operate in a manner that achieves the lowest energy cost.

12. The method according to claim 11, further comprising:
a) monitoring a temperature indoor ($T_{in}$) and outside ($T_{out}$); and
b) applying the temperature indoor ($T_{in}$) and outside ($T_{out}$) to calculate the minimum outdoor air flow rate for each building area required to meet the predefined range of $CO_2$ concentration and/or temperature and/or relative humidity and/or volatile organic compounds (VOCs) and/or particle concentration for each building area.

13. The method according to claim 11, wherein each air cleaning unit comprises one or more air quality sensors arranged inside the air cleaning unit.

14. The method according to claim 13, wherein at least one of the one or more air quality sensors is configured to detect the $CO_2$ concentration and/or temperature and/or relative humidity and/or volatile organic compounds (VOCs) and/or particle concentration inside the air cleaning unit.

15. The method according to claim 11, wherein the control system is communicatively connected to a cloud service, wherein the cloud service is configured to set a range of acceptable air quality levels.

16. The method according to claim 11, wherein the control system, on the basis of the data, determines if the number of air cleaning units can be changed in order to maintain the air quality within the predefined range.

17. The method according to claim 11, further comprising:
determining, on the basis of the data, if a position of one or more of the air cleaning units can be changed in order to maintain the air quality within the predefined range.

18. The method according to claim 11, further comprising:
a) determining when particle and/or VOC concentrations surpass predetermined thresholds set by predefined air quality standards; and
b) by using the control system, activating a number of the air cleaning units at a high speed.

19. The method according to claim 11, further comprising:
a) determining when particle and/or VOC concentrations are above minimum limits and below predefined thresholds outlined by air quality standards and $CO_2$ concentrations are below the predefined thresholds; and
b) by using the control system, activating a number of the air cleaning units at a moderate speed.

20. The method according to claim 11, further comprising:
determining a number of required air cleaning units to maintain a predefined air quality level, wherein the control system is applying information about the cleaning effect of the one or more air handling units.

21. The method according to claim 11, further comprising:
a) determining a change of energy expenditure achieved by moving the one or more air cleaning units to another position within the building; and
b) moving the one or more air cleaning units to the other position within the building if energy can be saved by moving the one or more air cleaning units to the other position within the building.

* * * * *